(12) United States Patent
Yoshida

(10) Patent No.: US 9,331,803 B2
(45) Date of Patent: May 3, 2016

(54) SYSTEM AND METHOD OF SYNCHRONIZATION AMONG A CONTROL APPARATUS AND A PLURALITY OF TERMINALS

(75) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 499 days.

(21) Appl. No.: 13/358,289

(22) Filed: Jan. 25, 2012

(65) Prior Publication Data

US 2012/0191878 A1 Jul. 26, 2012

(30) Foreign Application Priority Data

Jan. 26, 2011 (JP) ................................ 2011-013682

(51) Int. Cl.
*G06F 15/16* (2006.01)
*H04J 3/06* (2006.01)

(52) U.S. Cl.
CPC ............. *H04J 3/0638* (2013.01); *H04J 3/0682* (2013.01)

(58) Field of Classification Search
CPC ..... H04L 12/403; H04J 3/0638; H04J 3/0682
USPC ........................................................ 709/248
See application file for complete search history.

(56) References Cited

U.S. PATENT DOCUMENTS

| 2007/0127919 | A1* | 6/2007 | Kallstenius | 398/25 |
| 2010/0100917 | A1* | 4/2010 | Chiao et al. | 725/110 |
| 2010/0135332 | A1* | 6/2010 | Siemens et al. | 370/503 |
| 2010/0146321 | A1* | 6/2010 | Stark | 713/503 |
| 2010/0254225 | A1* | 10/2010 | Schweitzer et al. | 368/47 |
| 2010/0303100 | A1* | 12/2010 | Niamut et al. | 370/503 |
| 2011/0060934 | A1* | 3/2011 | Oh | 713/401 |
| 2011/0149756 | A1* | 6/2011 | Chan et al. | 370/252 |

FOREIGN PATENT DOCUMENTS

| JP | 2007-27985 A | 2/2007 |
| JP | 2007-97838 A | 4/2007 |
| JP | 2009-177591 A | 8/2009 |
| JP | 2010-68127 A | 3/2010 |

OTHER PUBLICATIONS

Communication dated Sep. 24, 2014, issued by the Japanese Patent Office in counterpart Japanese application No. 2011-013682.

* cited by examiner

*Primary Examiner* — June Sison
*Assistant Examiner* — Steven Nguyen
(74) *Attorney, Agent, or Firm* — Sughrue Mion, PLLC

(57) ABSTRACT

Disclosed is a synchronization system including a control apparatus and a plurality of terminals connected via a network. The control apparatus includes a transmitting unit that transmits first waiting time information to each of the terminals, where the first waiting time information is synchronization waiting time for a predetermined signal transmitted from the control apparatus to the terminals. Each of the terminals receives the first waiting time information from the control apparatus and receives second waiting time information from another of the terminals. The second waiting time information has been calculated by the other terminal based on the first waiting time information as received by the other terminal. Each terminal calculates a synchronization time for the predetermined signal based on both of the first waiting time information from the control apparatus and the second waiting time information from the other terminal.

8 Claims, 15 Drawing Sheets

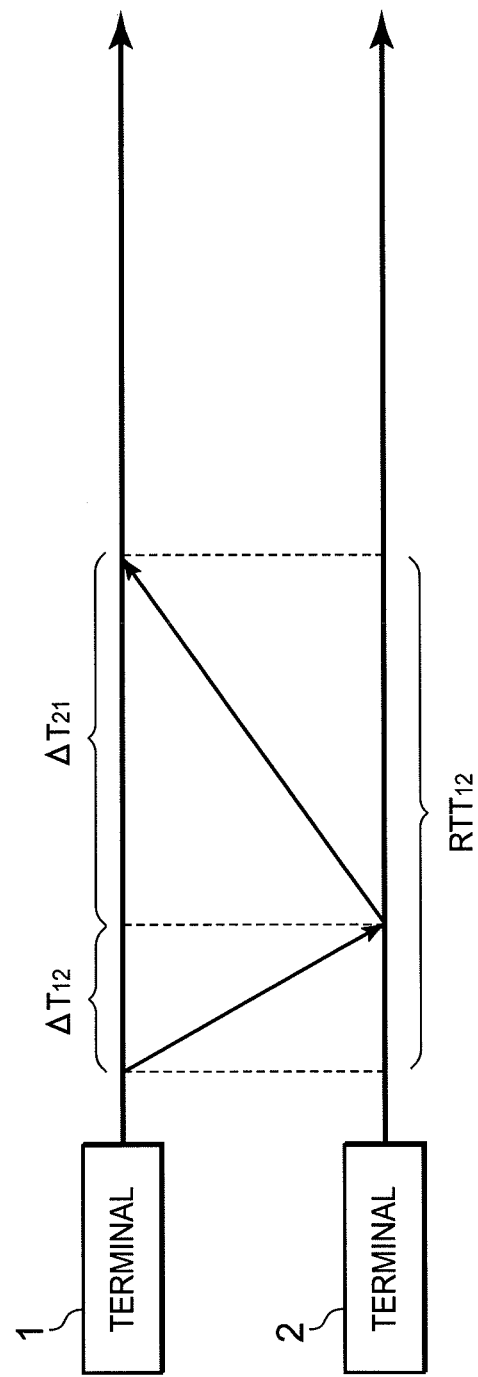

FIG. 6B

| | CONVENTIONAL METHOD | METHOD OF THE PRESENT INVENTION |
|---|---|---|
| MAXIMUM ERROR OF SYNCHRONIZATION | 146.8 [msec] | 54.4 [msec] |
| AVERAGE ERROR OF SYNCHRONIZATION (STANDARD DEVIATION) | 60.6 [msec] | 22.9 [msec] |

SYSTEM AND METHOD OF SYNCHRONIZATION AMONG A CONTROL APPARATUS AND A PLURALITY OF TERMINALS

CROSS REFERENCE TO RELATED APPLICATION

This application claims priority from Japanese patent application No. 2011-013682. filed on Jan. 26, 2011, the disclose of which is incorporated herein in its entirety by reference.

BACKGROUND

1. Field

Apparatuses and methods consistent with exemplary embodiments relate to a synchronization system that provides synchronization among a plurality of terminals connected to a network.

2. Description of the Related Art

A content sharing service has been proposed in which communication such as a telephone call is performed while content, such as a moving image, is simultaneously viewed among a plurality of terminals connected to a network. In such a content sharing service, if a moving image is simultaneously viewed among the plurality of terminals, reactions (laughs or surprises) to the viewed moving image, and a conversation in the telephone call become out of synchronization unless the same scene (in more detail, the same frame) of the moving image is displayed at the same time. In other words, a reproduction position, a stop position or the like of the simultaneously viewed moving image needs to be synchronized among the plurality of terminals. Here, a phenomenon in which the reproduction position or the stop position shifts among the plurality of terminals is hereinafter referred to as "error of synchronization".

A cause for occurrence of a problem of "error of synchronization" as described above exists in a network delay in transmission of a control signal for starting reproduction, stopping the reproduction or the like, to the plurality of terminals connected to the network. Specifically, an amount of the network delay (One-Way Delay Time) from a control signal transmitter (for example, a control server) to each terminal is greatly different depending on a network route thereof. Thus, even if the control signal has been transmitted to each terminal at the same time, a time when this control signal arrives at each terminal becomes different. As a result thereof, even if each terminal performs reproduction control according to the control signal, the error of synchronization occurs.

On the other hand, for the problem of the error of synchronization as described above, in a synchronization method described in Patent Literature 1, there is proposed a method of achieving synchronization by referring to a highly-accurate global clock (such as an NTP) from the plurality of terminals. Moreover, in a synchronization method described in Patent Literature 2, there is proposed a method of achieving synchronization by repeating a method of estimating the One-Way Delay Time from the control server to each terminal, based on ½ of an RTT (Round Trip Time=a sum of the One-Way Delay Time from the control server to the terminal, and the One-Way Delay Time from the terminal to the control server) (Technical Specification RFC (Request for Comments) 2030).

However, in the above described synchronization method described in Patent Literature 1, there is a problem that a global clock that can be referred to from all the terminals synchronously viewing the content and is highly accurate needs to exist, and if such a global clock cannot be prepared, this method is not applicable.

Moreover, in the above described synchronization method described in Patent Literature 2, a problem occurs in which if the One-Way Delay Time from the control server to each terminal greatly deviates from ½ of the RTT (if One-Way Delay Times of a going way and a returning way greatly deviate), synchronization accuracy decreases. Moreover, in this synchronization method, a method of increasing the synchronization accuracy by measuring the RTT more than once is employed. However, a problem also occurs in which a time for the measurement is required many times, and the measurement time is required for each reproduction control of the content. Furthermore, in a network in which there is a steady-state deviation in the One-Way Delay Time between the control server and a certain terminal (for example, the One-Way Delay Time from the control server to the terminal is always larger than the One-Way Delay Time from the terminal to the control server, or the like), a problem occurs in which the accuracy is not improved even by measuring the RTT more than once.

In addition, in both of the above described synchronization methods described in Patent Literature 1 and Patent Literature 2, a problem also occurs in which the more the number of the terminals synchronously viewing the content increases, the larger a maximum error of synchronization value (for example, a difference between a terminal that starts reproduction at the earliest time and a terminal that starts the reproduction at the latest time) stochastically becomes.

Consequently, an object is to provide a synchronization system in which highly-accurate synchronization is enabled in a short time even if the global clock, that can be referred to from all the terminals and is highly accurate, does not exist, and the decrease in the synchronization accuracy can be suppressed even if the number of terminals increases, which are the above described problems.

SUMMARY

According to an aspect of an exemplary embodiment, a synchronization system includes: a plurality of information processing apparatuses connected via a network, wherein a particular information processing apparatus includes a first waiting time transmitting unit for transmitting first waiting time information to a plurality of other information processing apparatuses that synchronize with one another for a predetermined signal transmitted from the particular information processing apparatus, the first waiting time information representing a synchronization waiting time for the predetermined signal in the other information processing apparatuses, and each of the other information processing apparatuses includes: a first waiting time receiving unit for receiving the first waiting time information transmitted from the particular information processing apparatus; a second waiting time transmitting unit for calculating second waiting time information representing a second synchronization waiting time for the predetermined signal in another information processing apparatus that mutually synchronizes with the apparatus itself for the predetermined signal, based on the received first waiting time information, and transmitting the second waiting time information to the another information processing apparatus; a second waiting time receiving unit for receiving the second waiting time information that has been calculated in the another information processing apparatus and transmitted from the another information processing apparatus to the apparatus itself; and a synchronization time calculating unit for calculating a synchronization time for the predetermined signal in the apparatus itself, based on the first waiting time information and the second waiting time information that have been received.

According to an aspect of another exemplary embodiment, an information processing apparatus is an information processing apparatus connected, via a network, to another information processing apparatus that mutually synchronizes for a predetermined signal transmitted from a particular information processing apparatus, and employs a configuration including: a first waiting time receiving unit for receiving first waiting time information that is transmitted from the particular information processing apparatus and represents a synchronization waiting time for the predetermined signal in the apparatus itself; a second waiting time transmitting unit for calculating second waiting time information representing a second synchronization waiting time for the predetermined signal in the another information processing apparatus, based on the received first waiting time information, and transmitting the second waiting time information to the another information processing apparatus; a second waiting time receiving unit for receiving the second waiting time information that has been calculated in the another information processing apparatus and transmitted from the another information processing apparatus to the apparatus itself; and a synchronization time calculating unit for calculating a synchronization time for the predetermined signal in the apparatus itself, based on the first waiting time information and the second waiting time information that have been received.

According to an aspect of another exemplary embodiment, a computer-readable medium is provided having stored thereon a program for causing an information processing apparatus connected, via a network, to another information processing apparatus that mutually synchronizes for a predetermined signal transmitted from a particular information processing apparatus, to realize: a first waiting time receiving unit for receiving first waiting time information that is transmitted from the particular information processing apparatus and represents a synchronization waiting time for the predetermined signal in the apparatus itself; a second waiting time transmitting unit for calculating second waiting time information representing a second synchronization waiting time for the predetermined signal in the another information processing apparatus, based on the received first waiting time information, and transmitting the second waiting time information to the another information processing apparatus; a second waiting time receiving unit for receiving the second waiting time information that has been calculated in the another information processing apparatus and transmitted from the another information processing apparatus to the apparatus itself; and a synchronization time calculating unit for calculating a synchronization time for the predetermined signal in the apparatus itself, based on the first waiting time information and the second waiting time information that have been received.

According to an aspect of another exemplary embodiment, a synchronization method is provided for a synchronization system including a plurality of information processing apparatuses connected via a network. The method includes a particular information processing apparatus transmits first waiting time information to a plurality of other information processing apparatuses that synchronize with one another for a predetermined signal transmitted from the particular information processing apparatus, the first waiting time information representing a synchronization waiting time for the predetermined signal in the other information processing apparatuses, and each of the other information processing apparatuses performs: receiving the first waiting time information transmitted from the particular information processing apparatus; calculating second waiting time information representing a second synchronization waiting time for the predetermined signal in another information processing apparatus that mutually synchronizes with the apparatus itself for the predetermined signal, based on the received first waiting time information, and transmitting the second waiting time information to the another information processing apparatus, and also receiving the second waiting time information that has been calculated in the another information processing apparatus and transmitted from the another information processing apparatus to the apparatus itself; and calculating a synchronization time for the predetermined signal in the apparatus itself, based on the first waiting time information and the second waiting time information that have been received.

One or more exemplary embodiments provide a synchronization system in which a highly-accurate synchronization is enabled in a short time without using a global clock, and a decrease in synchronization accuracy is suppressed even if the number of terminals increases.

BRIEF DESCRIPTION OF THE DRAWINGS

The above and/or other aspects will be come apparent and more readily appreciated from the following description of exemplary embodiments, taken in conjunction with the accompanying drawings, in which:

FIG. 2 is a diagram showing a relationship between a One-Way Delay Time and a Round Trip Time.

FIG. 6B is a diagram showing simulation results of a synchronization method according to an exemplary embodiment and a comparative synchronization method in the case where the number of terminals is three.

DETAILED DESCRIPTION

A first exemplary embodiment will be described with reference to FIGS. 1 to 13. It should be noted that, unlike a second exemplary embodiment to be described later, the present exemplary embodiment shows a mode for exchanging a control signal at a timing for achieving synchronization.

Figure 1A:
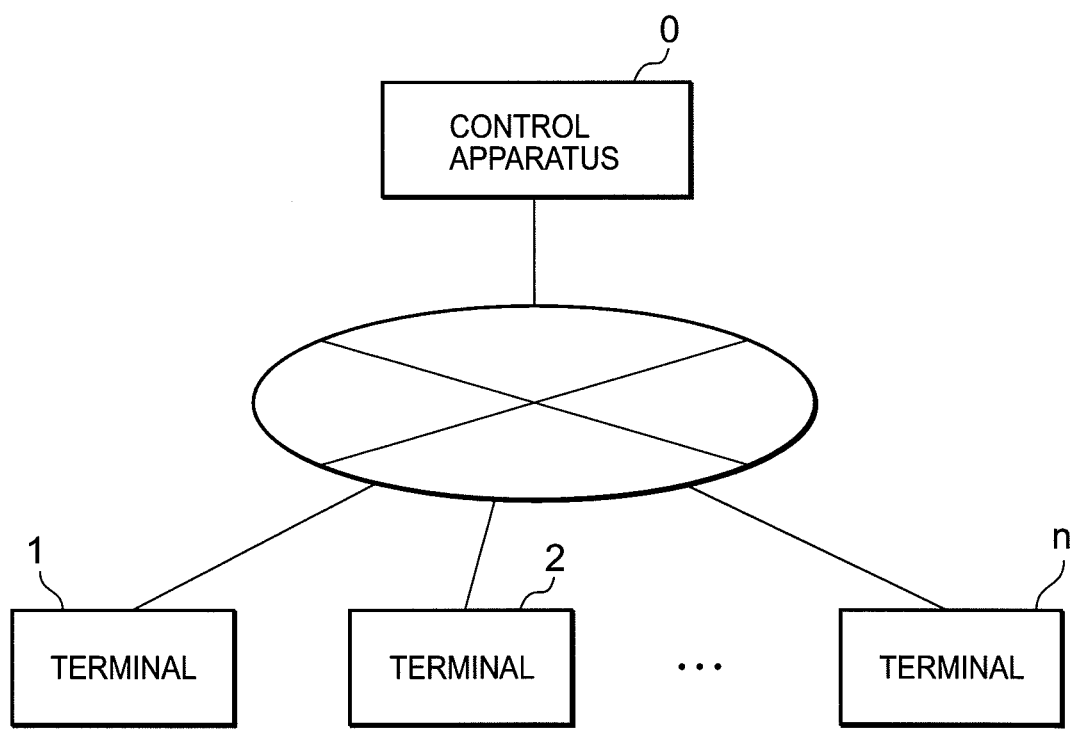
FIG. 1A is a block diagram representing an outline of a configuration of a synchronization system according to an exemplary embodiment.

As shown in FIG. 1A, in a synchronization system in the first exemplary embodiment, a control apparatus 0 responsible for synchronization control, and n terminals 1 to n (a plurality of other information processing apparatuses) that synchronize with one another for a predetermined control signal transmitted from the control apparatus 0 (a particular information processing apparatus), are connected via a network.

Figure 1B:
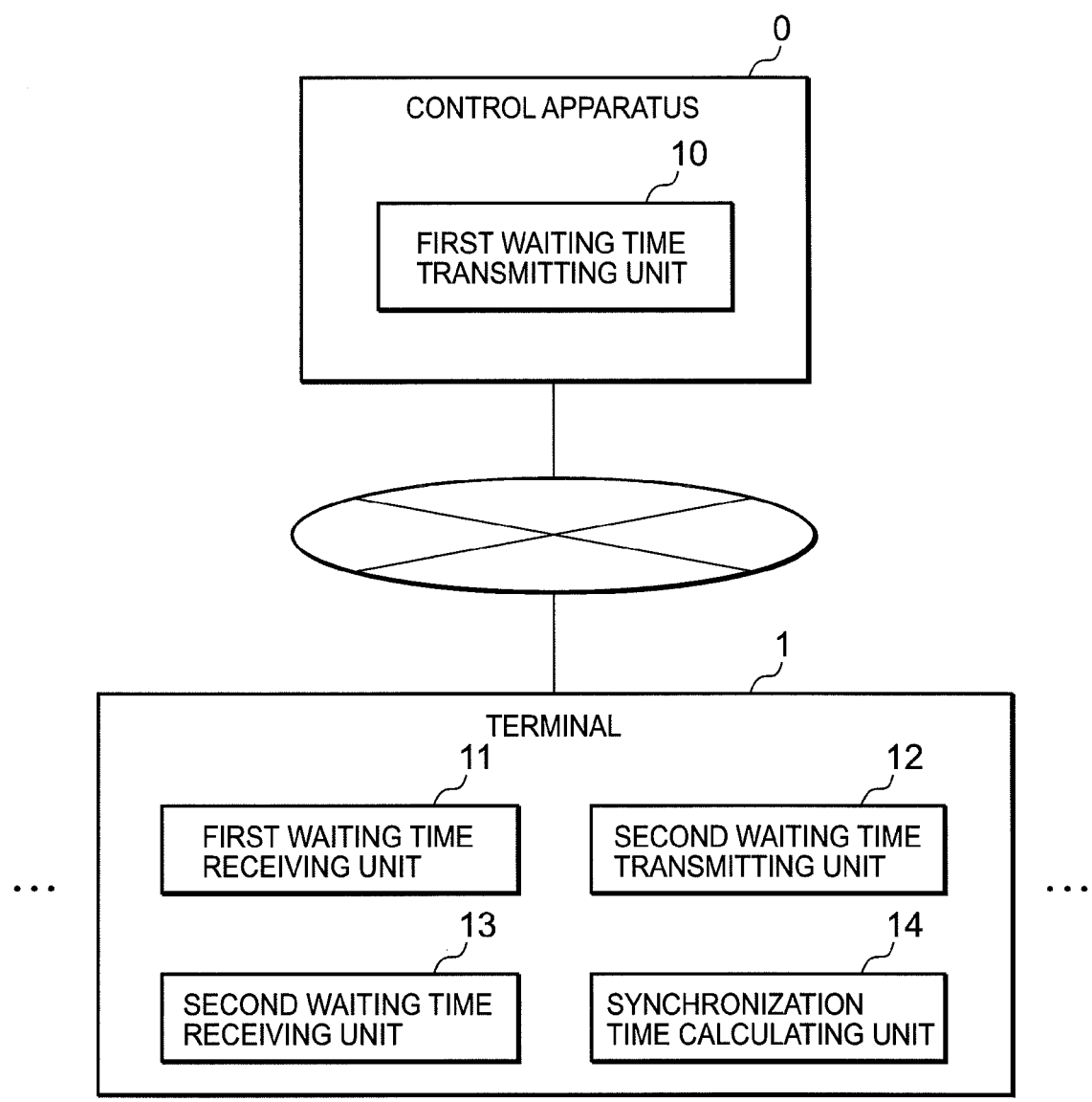
FIG. 1B is a block diagram showing configurations of a control apparatus and a terminal disclosed in FIG. 1A.

In addition, as shown in FIG. 1B, the control apparatus 0 includes a first waiting time transmitting unit 10, which may be embodied by a computer-readable program operated by a processor. As will be described later, for the terminals 1 to n that synchronize with one another, this first waiting time transmitting unit 10 calculates each first waiting time information representing a synchronization waiting time for the control signal in each of the terminals 1 to n, and transmits each first waiting time information to each of these terminals 1 to n.

Moreover, as shown in FIG. 1B, the terminal 1 includes a first waiting time receiving unit 11, a second waiting time transmitting unit 12, a second waiting time receiving unit 13, and a synchronization time calculating unit 14 which may be embodied by a computer-readable program operated by a processor. The first waiting time receiving unit 11 receives the first waiting time information transmitted from the control apparatus 0. Moreover, the second waiting time transmitting unit 12 calculates each second waiting time information, representing a second synchronization waiting time for the control signal, in another one of each of the terminals 2 to n (another information processing apparatus) that achieves the synchronization, based on the received first waiting time information, and transmits the second waiting time information to each of these terminals 2 to n. Correspondingly, the second waiting time receiving unit 13 receives second synchronization waiting time information that has been calculated in and transmitted from another one of the terminals 2 to n. Moreover, the synchronization time calculating unit 14 calculates calculating a synchronization time for the control signal in the terminal 1 itself, based on the first waiting time information received from the control apparatus 0, and each second waiting time information received from another one of the terminals 2 to n that mutually synchronizes.

It should be noted that the configuration of each of the terminals 2 to n that mutually synchronize may be the same as the configuration of the terminal 1. Accordingly, a repetitive description thereof is omitted.

Next, a synchronization method will be described in detail with reference to FIGS. 2 to 5. First, a one-way delay and a round trip delay within the synchronization system will be described with reference to FIG. 2. FIG. 2 is a diagram showing the one-way delay and the round trip delay between the terminal 1 and the terminal 2 that are connected to the network so that they can communicate with each other. Arrows extending from blocks of the terminal 1 and the terminal 2 in a right direction (lateral direction) indicate time axes, start points of arrows extending from predetermined points on the time axes (in the figure, an arrow extending in a lower right direction, and an arrow extending in an upper right direction) indicate transmission times of signals being transmitted between the terminals, and end points thereof indicate reception times of the signals.

FIG. 2 shows a situation in which the terminal 1 transmits a signal at a certain time, and simultaneously with the reception of the signal in the terminal 2, the terminal 2 transmits a signal to the terminal 1. "ΔT12" shown in the figure is a One-Way Delay Time of the signal from the terminal 1 to the terminal 2, and "ΔT21" is a One-Way Delay Time of the signal from the terminal 2 to the terminal 1. Generally, ΔT12 and ΔT21 are different values. In addition, a sum of the above described two One-Way Delay Times "RTT12=ΔT12+ΔT21" is a Round Trip Time "RTT12" between the terminal 1 and the terminal 2.

Unless the terminal 1 and the terminal 2 in FIG. 2 refer to the same or a highly accurately synchronized global clock, the One-Way Delay Time cannot be measured. On the other hand, the Round Trip Time can be measured only using a clock within each terminal. Thus, without using a global clock, only the Round Trip Time can be measured.

Figure 3:
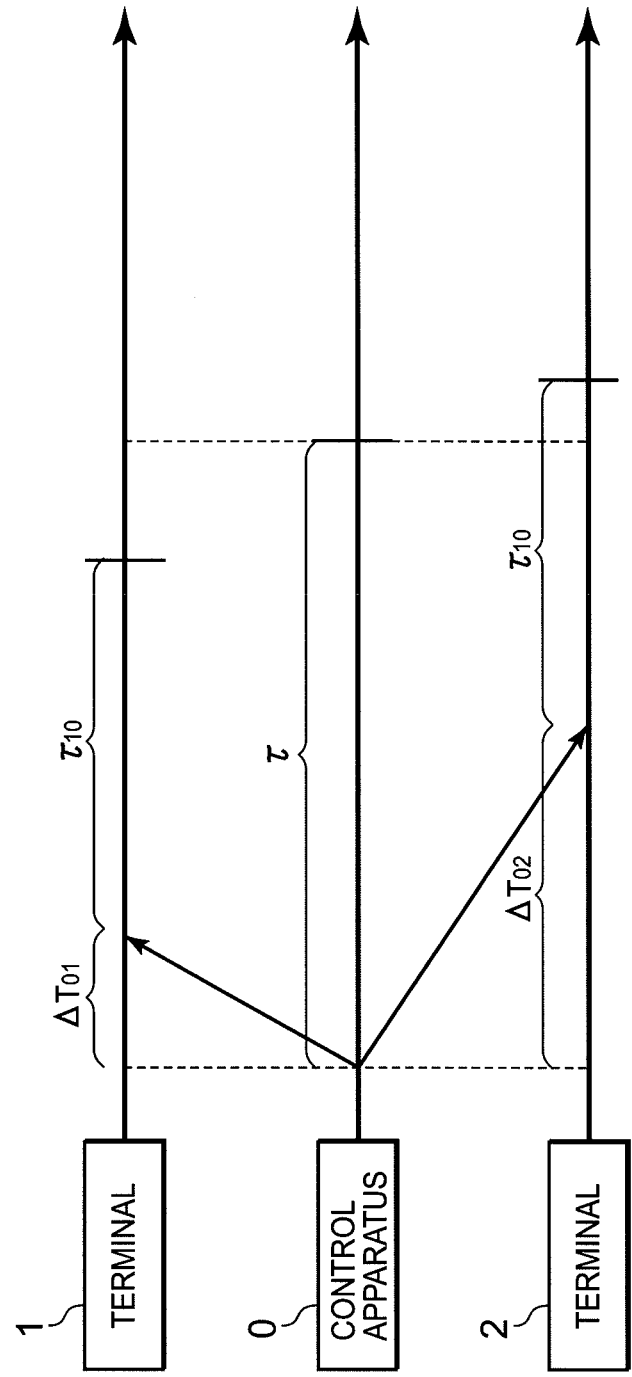
FIG. 3 is a diagram showing an outline of a comparative synchronization method.

Next, for comparison between a synchronization method according to an exemplary embodiment and a comparative synchronization method, a comparative synchronization method (a method not using the global clock) will be described with reference to FIG. 3. In FIG. 3, the control apparatus 0 responsible for the synchronization control, the terminal 1 and the terminal 2 are shown, and a method when the terminal 1 and the terminal 2 achieve the synchronization is shown.

In FIG. 3, the control apparatus 0 previously measures a Round Trip Time "RTT01" between the control apparatus 0 and the terminal 1, and a Round Trip Time "RTT02" between the control apparatus 0 and the terminal 2. In addition, s a waiting time for the synchronization "τ" (a reference synchronization waiting time), is previously set. While the reference synchronization waiting time "τ" may be any value, it is possible to ensure that a synchronization control signal is notified within the synchronization time, for example, by setting the reference synchronization waiting time "τ" to a maximum value of the Round Trip Time from the control apparatus 0 to each of the terminals 1 and 2. In other words, as the reference synchronization waiting time "τ", a difference time between a scheduled time when the terminals 1 and 2 achieve the synchronization, which has been previously set in consideration of the maximum value of the Round Trip Time, and a time for transmitting the first waiting time information, may be set. It should be noted that a time when the synchronization is achieved is referred to as "reference synchronization time".

While the control apparatus 0 simultaneously notifies each terminal of the waiting time for the synchronization (i.e.

transmits a control signal, including the waiting time for synchronization, simultaneously to each of the terminals), the time when each terminal receives the control signal is different due to the different One-Way Delay Times to the different terminals. Consequently, the comparative synchronization method approximates a One-Way Delay Time "ΔT0i" from the control apparatus 0 to a terminal i (i=1,2 in FIG. 3), as ½ of a Round Trip Time "RTT0i", notifies each terminal of a value obtained by subtracting the approximated value of the One-Way Delay Time from the previously set reference synchronization waiting time "τ", as a first synchronization waiting time, and thereby achieves the synchronization. Accordingly, the first synchronization waiting time "τ0i" in the terminal i for achieving the synchronization, which is notified by the control apparatus 0, is represented in the following Expression 1.

$$\tau 0i = \tau - (1/2) \times RTT0i \qquad \text{[Expression 1]}$$

Thus, each of the terminals 1 and 2 waits for the first synchronization waiting time "τ0i", calculated according to Expression 1, then performs content reproduction control or the like, and thereby achieves the synchronization between the terminals. However, as described above, when the One-Way Delay Time "ΔT0i" is approximated with ½ of the Round Trip Time "RTT0i", an error occurs in this One-Way Delay Time. Here, an error "ei" between the reference synchronization time in each terminal i, which is notified by the control apparatus 0, and a time after waiting for the first synchronization waiting time τ0i (a first synchronization time), is calculated according to Expression 2.

$$ei = \tau 0i - (\tau - \Delta T0i) = (\Delta Ti0 - \Delta T0i)/2 \qquad \text{[Expression 2]}$$

As can be seen from Expression 2, the closer the One-Way Delay Time (going way) ΔT0i and the One-Way Delay Time (returning way) ΔTi0 are, the smaller a difference between the reference synchronization time and the first synchronization time becomes.

Next, an exemplary synchronization method will be described with reference to FIG. 4. The first waiting time transmitting unit 10 of the control apparatus 0 uses the Round Trip Time "RTT0i" for each terminal i to calculate each first synchronization waiting time "τ0i", and transmits this first synchronization waiting time "τ0i" to each corresponding terminal i.

In addition, according to this exemplary embodiment, each terminal i receives the first synchronization waiting time "τ0i" transmitted from the control apparatus 0, at the first waiting time receiving unit 11. Then, at the second waiting time transmitting unit 12, the terminal I notifies another terminal j (i≠j) of a second synchronization waiting time "τij" in the terminal j, based on the received first synchronization waiting time "τ0i". Here, a method of calculating the above described second synchronization waiting time "τij" will be described.

First, when receiving the control signal for the first synchronization waiting time "τ0i" from the control apparatus 0, the terminal i knows that it may perform the reproduction control beginning at a time "τ0i" after a time of the reception of the control signal. In this way, a concept is that if the terminal i has received first synchronization waiting time information from the control apparatus 0, the terminal i also notifies another terminal j of this information.

Specifically, at the time when the terminal i has received the control signal from the control apparatus 0, if this terminal i notifies the terminal j of the second synchronization waiting time information, the synchronization is enabled by notifying the terminal j of a waiting time "τ0i−ΔTij". However, since a One-Way Delay Time ΔTij between the terminal i and the terminal j cannot be measured, instead, ½ of a Round Trip Time "RTTij" between the terminal i and the terminal j is also used here as the One-Way Delay Time. Accordingly, when the terminal i has received the control signal from the control apparatus 0, the second synchronization waiting time "τij", to be notified from the second waiting time transmitting unit 12 of the terminal i to the terminal j, is a value obtained by subtracting ½ of the Round Trip Time "RTTij" between the terminal i and the terminal j, from the received first synchronization waiting time "τ0i". Thus, τij is calculated as shown in Expression 3.

$$\tau ij = \tau 0i - (1/2) \times RTTij \qquad \text{[Expression 3]}$$

According to the above process, the terminal j obtains information on a first waiting time "τ0j" that has been notified by the control apparatus 0 and received at the first waiting time receiving unit 11, and a second synchronization waiting time "τij" that has been notified by the terminal i, and potentially other terminals as well, and received at the second waiting time receiving unit 13.

Then, each terminal that has obtained the first and second synchronization waiting times as described above calculates a synchronization time at the synchronization time calculating unit 14. Here, a time when the terminal j has received the notification of the first synchronization waiting time from the control apparatus 0 is denoted as "r0j", and a time when the terminal j has received the notification of the second synchronization waiting time from the terminal i is denoted as "rij". Both r0j and rij are the times timed by a clock held by the terminal j (according to a local clock of the terminal j). At this time, a first synchronization time s0j (according to the local clock of the terminal j) notified by the control apparatus 0, and a second synchronization time sij (according to the local clock of the terminal j) notified by the terminal i become as shown in Expression 4 and Expression 5, respectively.

$$s0j = r0j + \tau 0j = r0j + \tau - (1/2) \times RTT0j \qquad \text{[Expression 4]}$$

$$sij = rij + \tau ij = rij + \tau 0i - (1/2) \times RTTij = rij + \tau - (1/2) \times RTT0i - (1/2) \times RTTij \qquad \text{[Expression 5]}$$

In addition, since the terminal j can obtain a plurality of the synchronization times (one first synchronization time based on information from the control apparatus and one or more second synchronization times based on information from other terminals) as above, the terminal j can determine a final synchronization time (a third synchronization time) "sj" (according to the local clock of the terminal j) from these plurality of synchronization times by using a statistical approach. If an average value is employed as the statistical approach, the synchronization time "sj" is calculated according to Expression 6.

$$sj = (s0j + \Sigma sij)/n \qquad \text{[Expression 6]}$$

where Σ is a summation of i=1, 2, ..., j−1, j+1 ..., n.

Moreover, in the above Expression 6, while the synchronization time "sj" is calculated by a simple average value, a weighted average may be employed in the calculation. If the weighted average is employed in the calculation of the synchronization time "sj", a weighted average that assigns a greater weight to the synchronization time "sij" in a case where the Round Trip Time "RTTij" is smaller may be employed by utilizing a fact that the smaller the Round Trip Time "RTTij" is, the smaller an absolute value of an error between an estimated value of the One-Way Delay Time "½RTTij" and a real One-Way Delay Time becomes.

Specifically, as an example of the weighted average, there is a method in which the negative square of "RTTij" for estimating the first and second synchronization times "sij" is set as a weight coefficient. When the control signal has been notified from the control apparatus 0→the terminal i→the terminal j, a sum of "RTT" thereof becomes "RTT0$j$+RTTji". The negative square of this "RTT0$j$+RTTji" is set as the weight coefficient. In other words, a weight coefficient represented by a function using the Round Trip Time in routes on the network through which the first waiting time information and the second waiting time information have been transmitted is used. However, also in a case of the control apparatus 0→the terminal j, it is represented as "RTT0$j$+RTTji" with "RTTjj=0". At this time, if a weight coefficient "wi" is "1/(RTT0$j$+RTTji)$^2$", Expression 6 is rewritten as the following Expression 6'.

$$sj=(\Sigma wi \times sij)/(\Sigma wi) \quad \text{[Expression 6']}$$

where $\Sigma$ in Expression 6' is a summation of i=0, 1, 2, . . . , j−1, j+1, . . . , n.

As above, according to a synchronization method of this exemplary embodiment, a terminal determines not only a first synchronization time according to a notification from the control apparatus, but also determines one or more second synchronization times according to one or more notifications from other terminals, and thereby, an amount of information about the synchronization time is increased and a synchronization accuracy can be improved.

Next, an improvement of the synchronization accuracy in the synchronization method will be mathematically proven. First, while the final third synchronization time "si" in a terminal i is calculated according to the above described Expression 6, if Expression 4 and Expression 5 are assigned to Expression 6, it becomes as the following Expression 7.

$$si=\tau+(1/n)\times(r0i+\Sigma rji-\text{RTT}0i/2-\Sigma(\text{RTT}0j)/2-\Sigma(\text{RT-}Tji)/2) \quad \text{[Expression 7]}$$

where $\Sigma$ is a summation of j=1, 2, . . . , i−1, i+1 . . . , n.

Here, it is considered to represent a reception time "r0$i$" of the notification of the first synchronization waiting time from the control apparatus 0, and a reception time "rji" of the notification of the second synchronization waiting time from the terminal j, at the terminal i, temporarily in the global clock. If a time (according to a global clock) when the notification of the first synchronization waiting time has been transmitted at the control apparatus 0 is assumed to be "t", "r0$i$" and "rji" become as shown in Expression 8 and Expression 9 (according to the global clock).

$$r0j \to t+\Delta T0i \quad \text{[Expression 8]}$$

$$rji \to t+\Delta T0j+\Delta Tji \quad \text{[Expression 9]}$$

If the third synchronization time "si" in the local clock in the terminal i is represented in the global clock by assigning the above Expression 8 and Expression 9 to Expression 7, it becomes as shown in Expression 10.

$$si \to t+\tau+(\Delta T0i-\Delta Ti0)/2+(1/n)\times\Sigma(\Delta T0j-\Delta Tj0)/2+(1/n)\times\Sigma(\Delta Tji-\Delta Tij)/2 \quad \text{[Expression 10]}$$

In the above Expression 10, the first E is set as a summation of j=1, 2, . . . , n (the second $\Sigma$ remains to be a summation of j=1, 2, . . . , i−1, i+1, . . . , n), and Expression 10 is simplified as Expression 11.

$$si \to t+\tau+\{\Sigma(\Delta T0j-\Delta Tj0)+\Sigma(\Delta Tji-\Delta Tij)\}/2n \quad \text{[Expression 11]}$$

Eventually, an error "ei" between the reference synchronization time set by the control apparatus 0, and the third synchronization time, in the terminal i, becomes as shown in Expression 12.

$$ei=\{\Sigma(\Delta T0j-\Delta Tj0)+\Sigma(\Delta Tji-\Delta Tij)\}/2n \quad \text{[Expression 12]}$$

Two summations in the above Expression 12 are summations regarding a difference between the going way and the returning way that are the One-Way Delay Times between the control apparatus and the terminal, or between the terminals. As described in FIG. 2, when attention is focused on a certain network route, the One-Way Delay Times of the going way and the returning way are different, and thus, a difference occurs between the One-Way Delay Times of the going way and the returning way. However, if differences between the One-Way Delay Times of the going way and the returning way in a plurality of routes are added and averaged, the average becomes closer to a real average value of the differences between the One-Way Delay Times of the going way and the returning way in all the routes within the network, as the number of samples of the routes increases, according to the law of large numbers. Generally, also, there is often a case where an uplink (a transmission direction from an end node to a core node of a network) and a downlink (a transmission direction from a core node of a network to an end node of the network) are asymmetric in the network. However, correlation between the going way/returning way in all the routes within the network and upward/downward is low, and the One-Way Delay Times of the going way and the returning way in all the routes within the network can be regarded to be symmetric. As a result thereof, there is no problem in considering that the real average value of the differences between the One-Way Delay Times of the going way and the returning way in all the routes within the network is "0". If it is assumed that this supposition is correct, the summations in Expression 12 become asymptotic to 0 as n becomes larger (Expression 13). In other words, in the synchronization method, there is a characteristic that as the number of terminals n increases, the more the synchronization accuracy increases.

$$ei \to 0(n \to \text{infinity} \to \infty) \quad \text{[Expression 13]}$$

On the other hand, in a comparative synchronization method, since the error shown in Expression 2 remains in each terminal, the synchronization accuracy becomes lower than that of a synchronization method according to exemplary embodiments described herein. In addition, when the number of terminals n becomes large, there is a high probability that a difference between a maximum value and a minimum value of the error in Expression 2 becomes large. Thus, it means that the larger the number of terminals n becomes, the more the synchronization accuracy decreases, in the comparative synchronization method.

Figure 4:
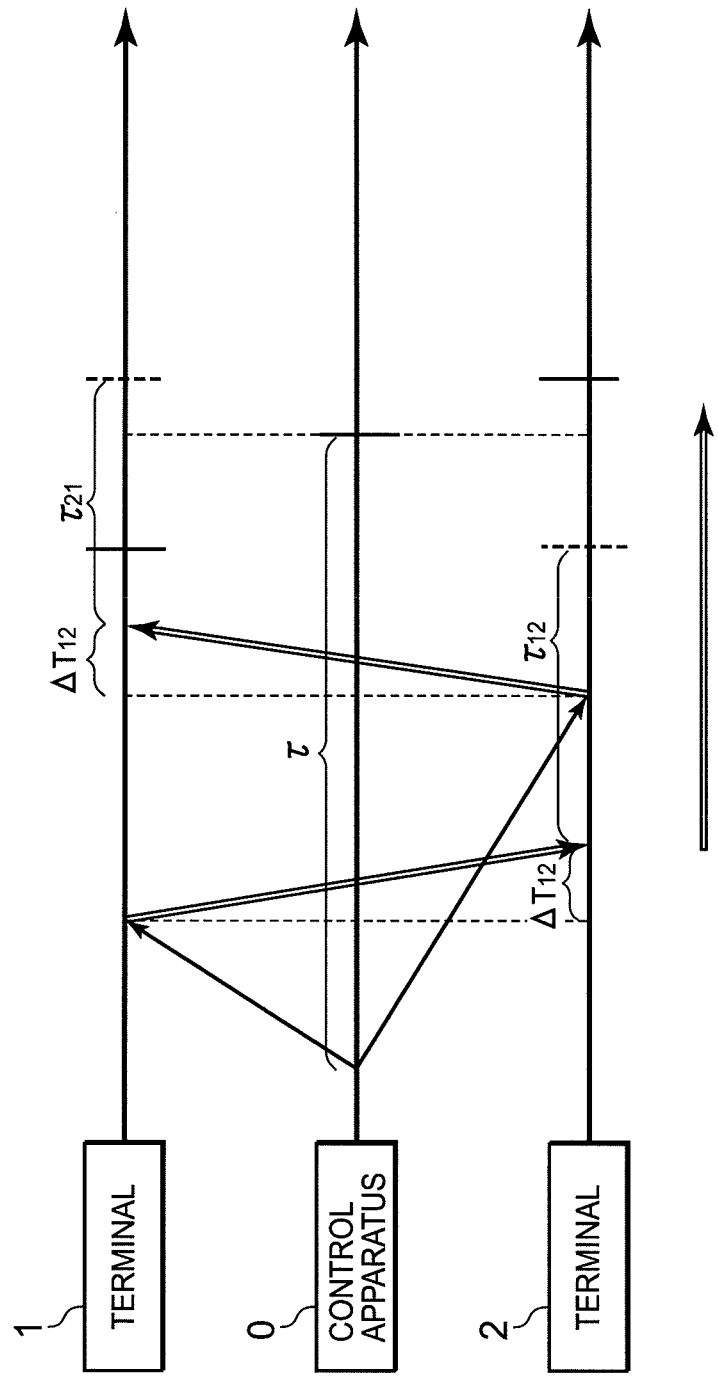
FIG. 4 is a diagram showing an outline of a synchronization method according to an exemplary embodiment.
Figure 5:
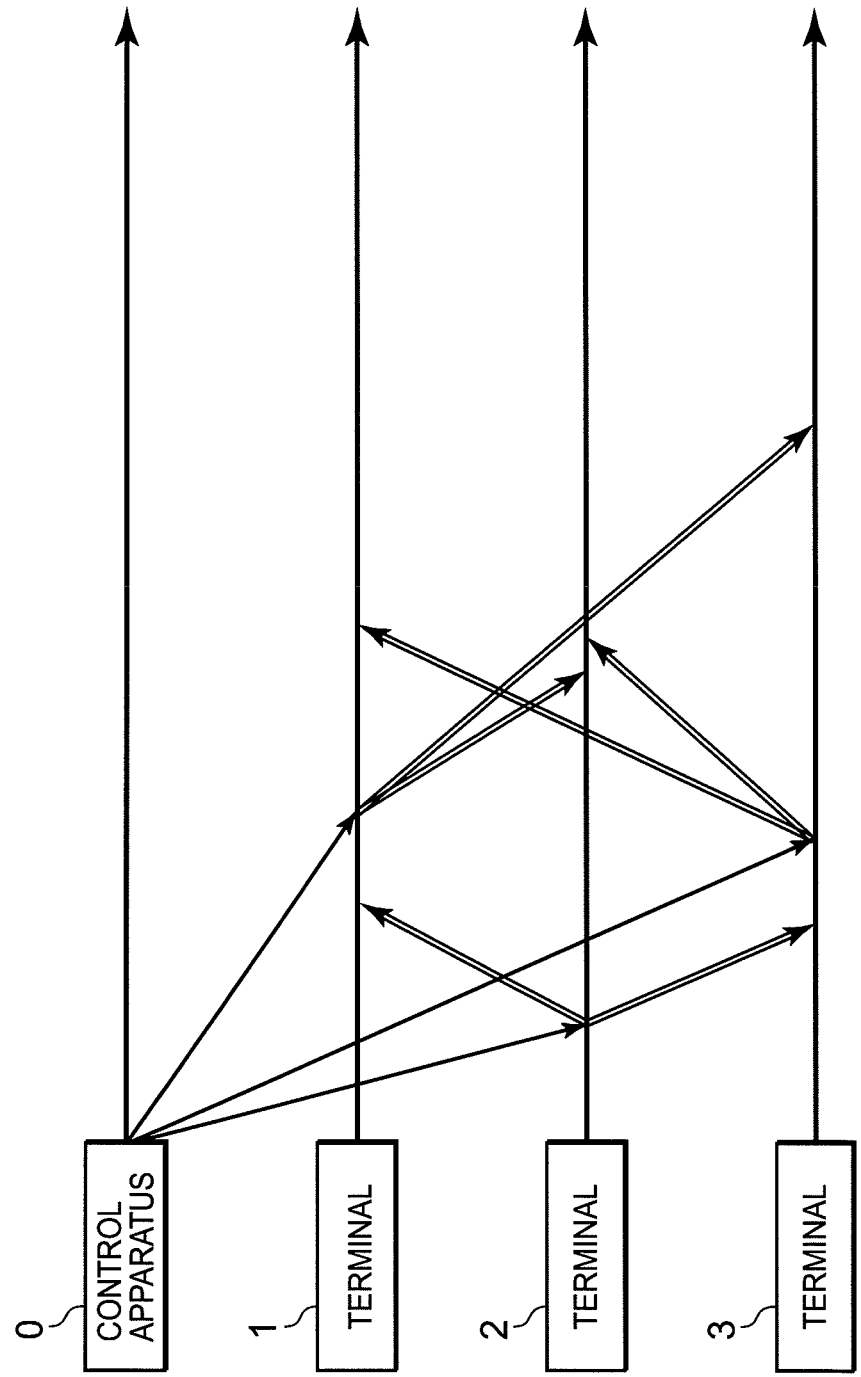
FIG. 5 is a diagram showing a situation of control signal transmission in a synchronization method according to an exemplary embodiment in a case where the number of terminals is three.

As above, the synchronization method in a case where the number of terminals n is two has been described in FIG. 4. However, an exchange of synchronization signals in a case where the number of terminals n is three is shown in FIG. 5. In other words, in both FIGS. 4 and 5, a single line arrow represents the first synchronization waiting time information transmitted from the control apparatus 0 to each of the terminals 1 to 3 (the terminals 1 and 2 in FIG. 4), and a double line arrow represents second synchronization waiting time information transmitted from each of the terminals 1 to 3 that has received the first synchronization waiting time information, to another terminal.

Figure 6A:
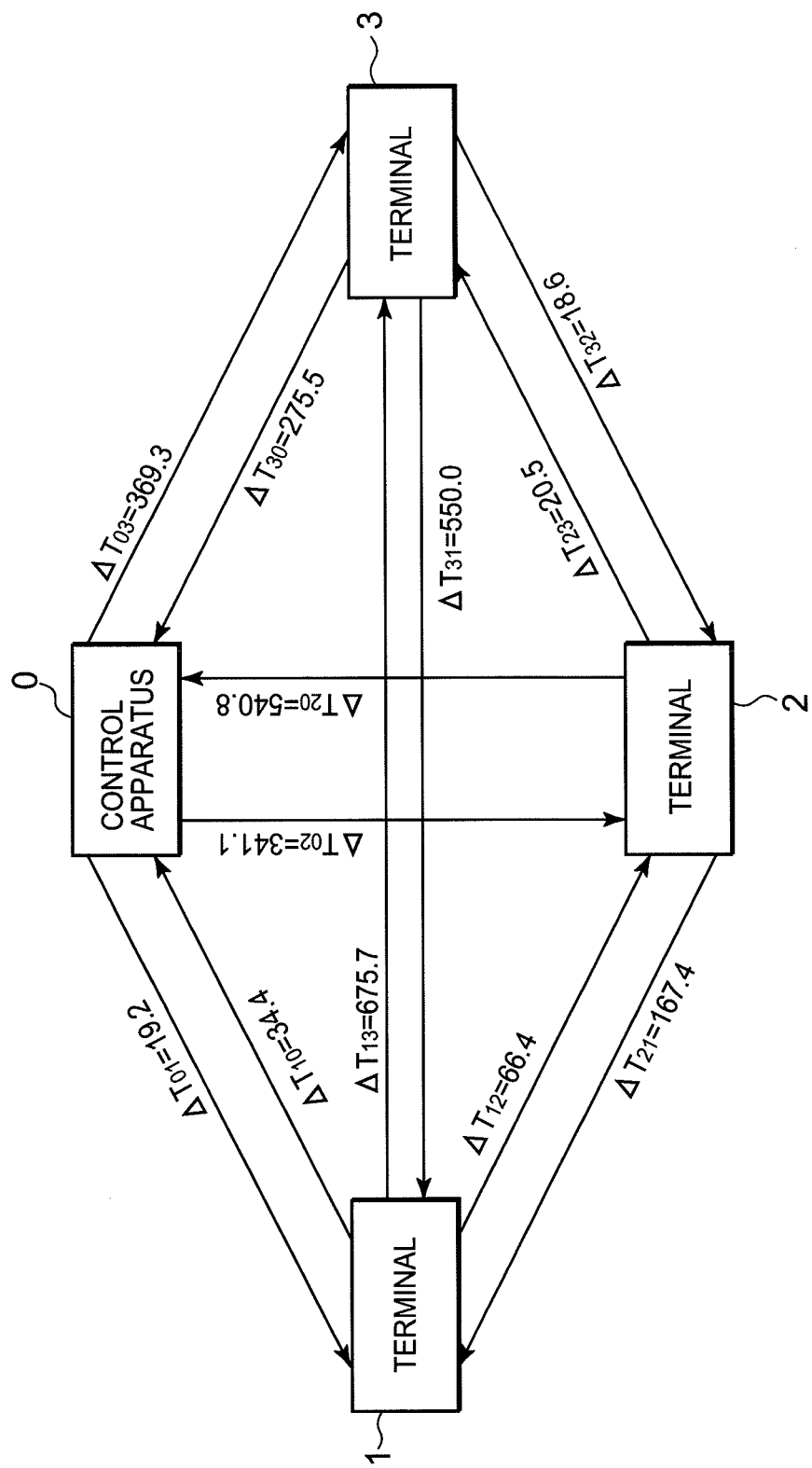
FIG. 6A is a diagram showing a situation of a simulation of a synchronization method according to an exemplary embodiment in the case where the number of terminals is three.

In addition, FIGS. 6A and 6B are diagrams representing a simulation indicating an effect of a synchronization method according to exemplary embodiments described herein in the case where the number of terminals n is three. In FIG. 6A, each of the One-Way Delay Times $\Delta Tij$ among the control apparatus 0 and the terminals is indicated on each arrow in units of milliseconds. In this condition, when the synchronization has been achieved in both the comparative synchronization method and the synchronization method, a maximum value of an error of synchronization among the terminals, and a mean squared error=a standard deviation of the error of synchronization in each terminal are calculated and shown in a table as shown in FIG. 6B. Then, a maximum error of synchronization is "146.8 msec" in the conventional method, whereas it becomes "54.4 msec" in the synchronization method according to exemplary embodiments described herein, which has been able to improve the synchronization accuracy of the other method by 62.9%. Moreover, also regarding the standard deviation, it is "60.6 msec" in the other method, whereas it becomes "22.9 msec" in the synchronization method, which has been able to improve it by 62.2%.

Figure 7:
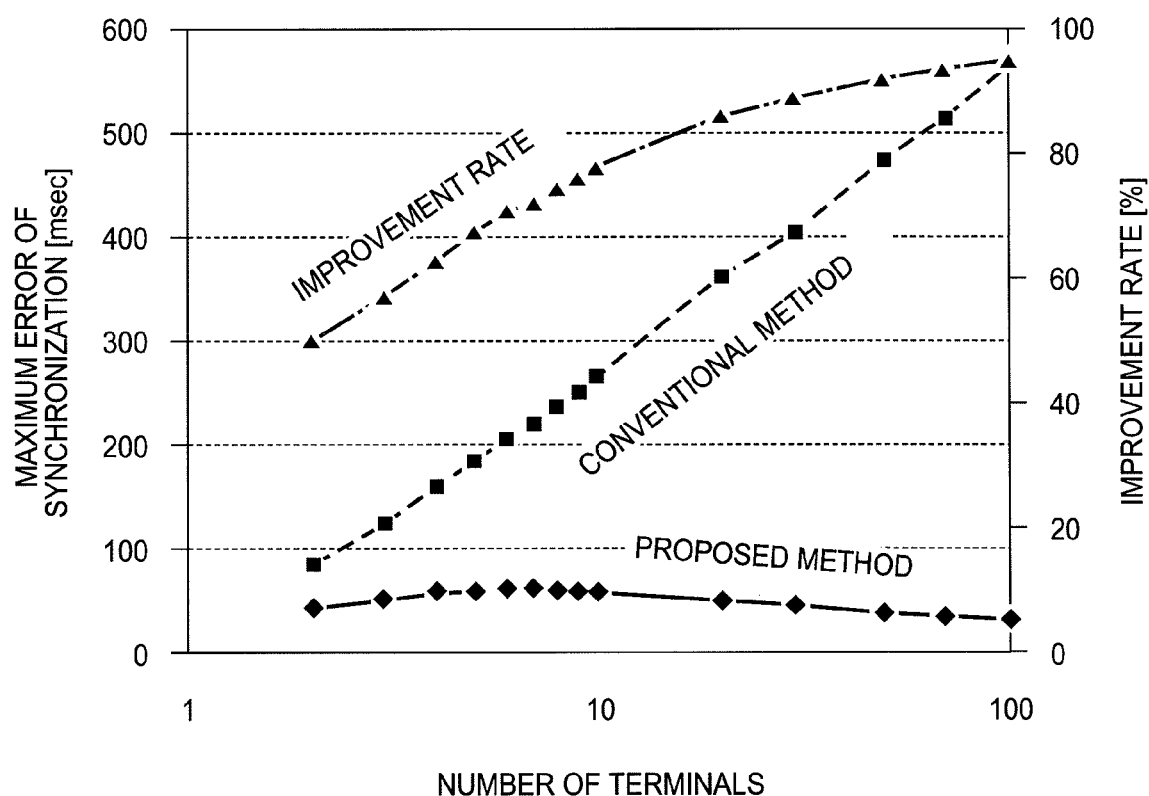
FIG. 7 is simulation results of a maximum error of synchronization in a comparative synchronization method and a synchronization method according to an exemplary embodiment.
Figure 8:
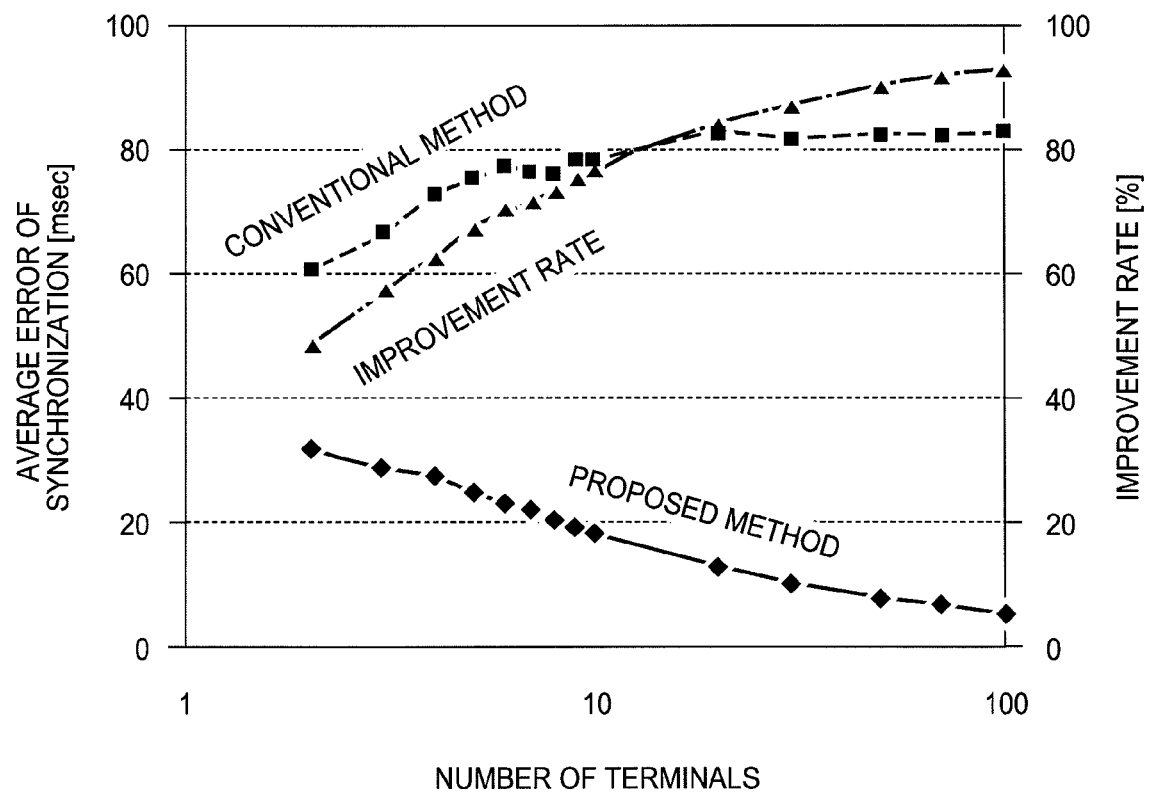
FIG. 8 is simulation results of an average error of synchronization in a comparative synchronization method and a synchronization method according to an exemplary embodiment.

Moreover, FIGS. 7 and 8 show the maximum error of synchronization (a vertical axis) and an average error of synchronization (the vertical axis) when the number of terminals n is changed from 2 to 100, and plot simulation results of the comparative synchronization method (comparative method), the synchronization method (proposed method), and an improvement rate (a right axis) in the synchronization method relative to the comparative one, respectively. However, a plotted value is an average value of 1000 simulation results, and in each simulation, the One-Way Delay Times among the control apparatus 0 and the respective terminals have been determined as will be described next, and the comparative synchronization method and the synchronization method according to exemplary embodiments have been simulated.

For the One-Way Delay Times among the control apparatus 0 and the respective terminals, first, one positive random number is selected from a normal distribution N(250,250) having an average of 250 and a standard deviation of 250, and this is set as a reference value S. Two positive random numbers are selected from a normal distribution N(S,S/3) from this reference value S, and they are set as ΔTij and Δji, respectively. This is performed for i→j, j→i in all the routes, and the One-Way Delay Times in all the routes are determined. The reference value has been selected first from N(250,250) because an average One-Way Delay Time is said to be on the order of 250 msec in the Internet. The random numbers have been newly selected from the normal distribution based on the reference value selected from N(250,250), so that a great difference does not occur between delay amounts in the going way and the returning way.

With reference to the results of FIGS. 7 and 8, the improvement rate is approximately 50% when the number of terminals n (a horizontal axis) is "2", and subsequently, the more the number of terminals increases, the more the improvement rate improves. This is because the more the number of terminals increases, the more the number of terminals having the error of synchronization increases in the comparative method, whereas the more the number of terminals increases, the more the summations in Expression 12 become asymptotic to 0, and thus the synchronization accuracy improves in the synchronization method according to exemplary embodiments.

Figure 9:
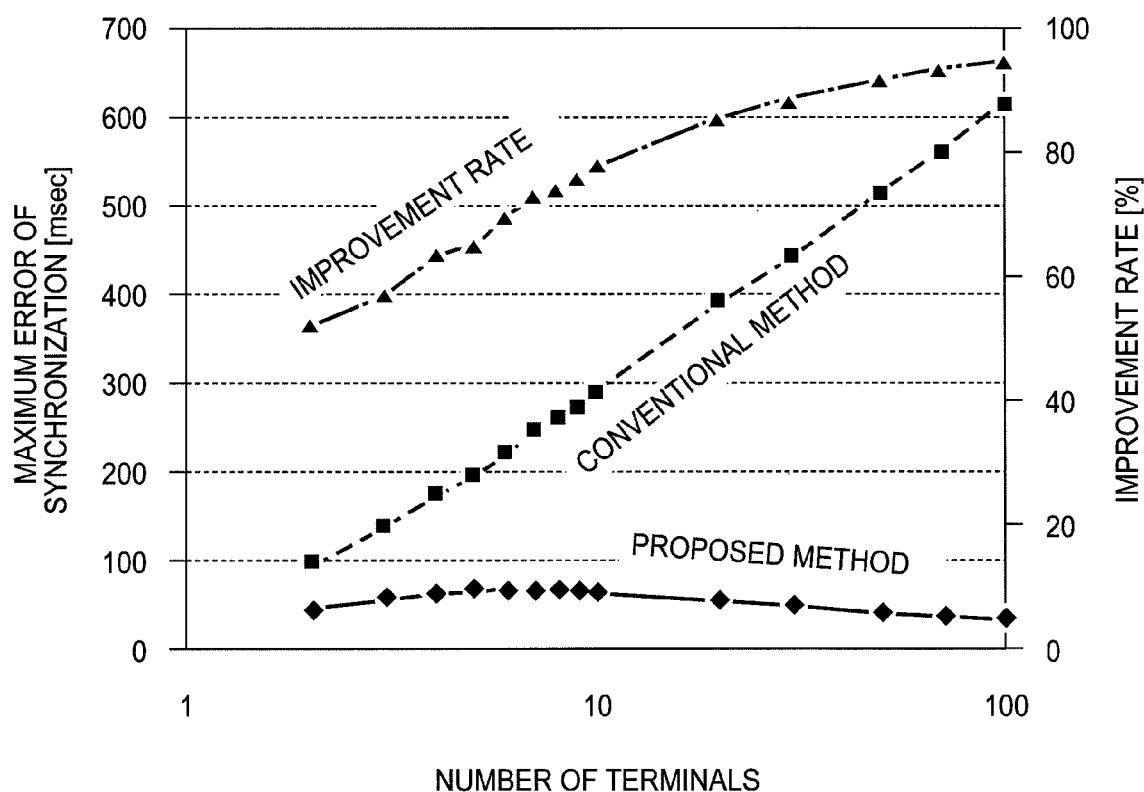
FIG. 9 is simulation results of the maximum error of synchronization in a comparative synchronization method and a synchronization method according to an exemplary embodiment when an RTT measurement error is 10%.
Figure 10:
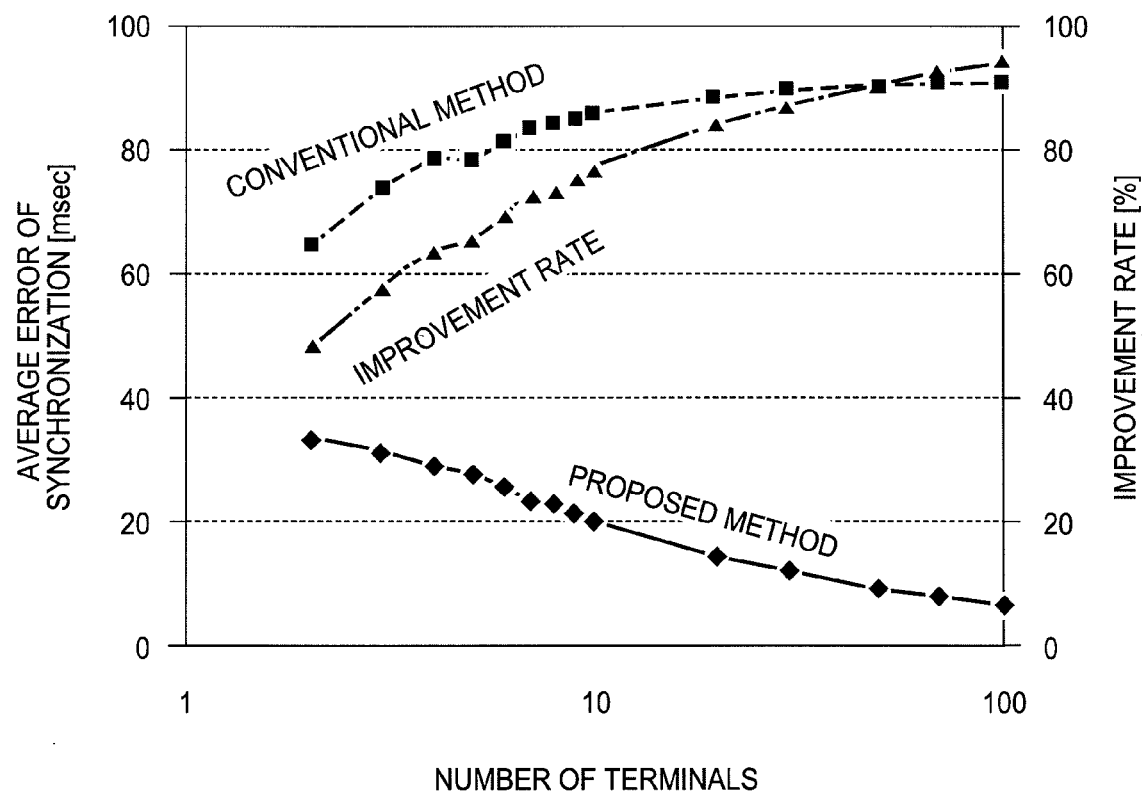
FIG. 10 is simulation results of the average error of synchronization in a comparative method and a synchronization method according to an exemplary embodiment when the RTT measurement error is 10%.

FIGS. 9 and 10 are simulation results of the maximum error of synchronization and the average error of synchronization in a case where a white noise with a standard deviation of 10% is included in the Round Trip Time to be measured. If the Round Trip Time is measured in an actual network environment, an error is inevitably included, and thus they are simulations for examining an effect of the error. As the results of the simulations, it can be seen that even if the error is included, the synchronization method according to exemplary embodiments can achieve more highly-accurate synchronization than the comparative synchronization method. Regarding this, even if the measurement error is included in the Round Trip Time, since the average value or the weighted average value of the synchronization times notified from the plurality of routes is employed in the synchronization method according to exemplary embodiments, the effect of the error reduces in a calculation process thereof according to the law of large numbers or the central limit theorem, and high synchronization accuracy can be realized.

Figure 11:
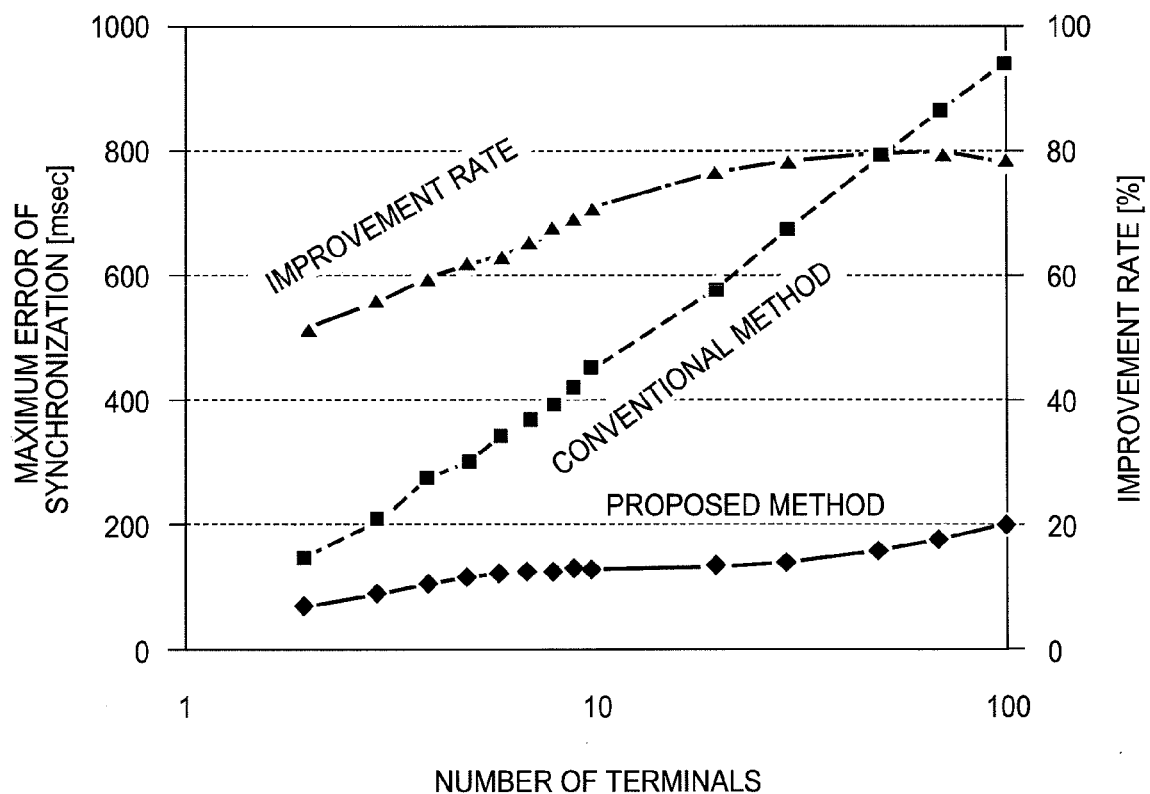
FIG. 11 is simulation results of the maximum error of synchronization in a comparative synchronization method and a synchronization method according to an exemplary embodiment when the RTT measurement error is 30%.
Figure 12:
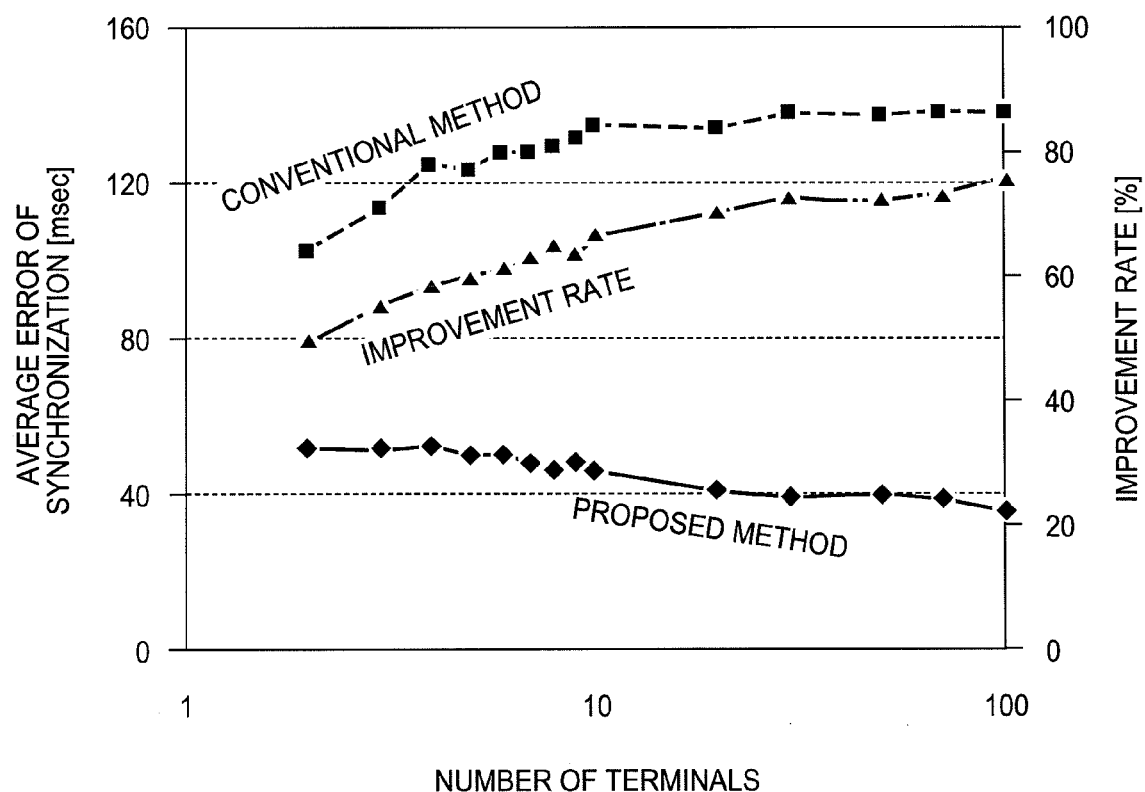
FIG. 12 is simulation results of the average error of synchronization in a comparative synchronization method and a synchronization method according to an exemplary embodiment when the RTT measurement error is 30%.

FIGS. 11 and 12 are simulation results of the maximum error of synchronization and the average error of synchronization in a case where a white noise with a standard deviation of 30% is included in the Round Trip Time to be measured. When the noise becomes great, the synchronization accuracy decreases more than when the noise is small. However, it can be seen that the synchronization method according to exemplary embodiments has been able to achieve the accuracy higher than the comparative synchronization method.

Figure 13:
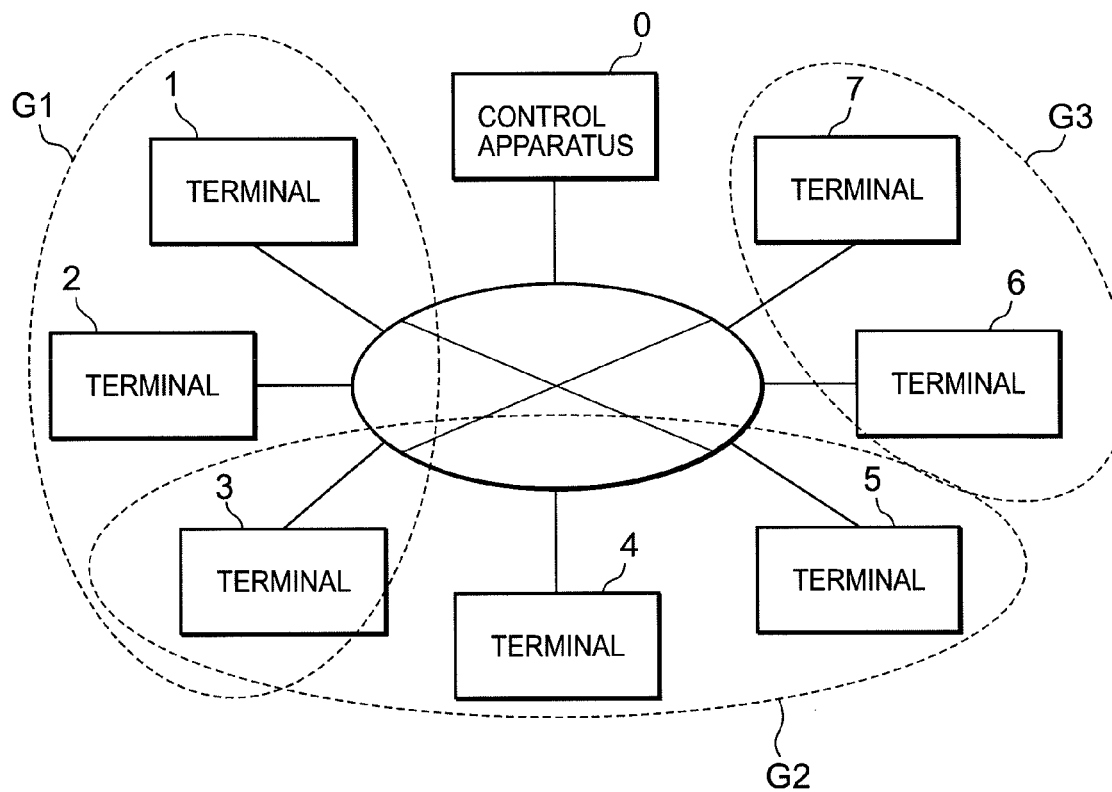
FIG. 13 is a diagram showing a configuration example when a synchronization method according to an exemplary embodiment is divided into a plurality of groups and executed.

Hereinabove, the description has been provided on the assumption that all the terminals that achieve the synchronization transmit the control signal to the other terminals. However, as shown in FIG. 13, the synchronization control may be performed by dividing them into several synchronization groups G1 to G3. Then, the same terminal may belong to a plurality of synchronization groups. In this way, a problem of increase in a processing load on a single terminal in a case where the number of terminals becomes large can be solved by dividing them into the synchronization groups that are small to some extent.

Moreover, hereinabove, the description has been provided on the assumption that the control apparatus and the terminal are separate apparatuses. However, a configuration may be employed in which a certain terminal also functions as the control apparatus.

Next, a second exemplary embodiment will be described. The synchronization method in the above described first exemplary embodiment has assumed that the reference waiting time for the synchronization "τ" that is set by the control apparatus 0 has a length sufficient so that the notification of all the synchronization control signals is completed. However, if there is a terminal with a large amount of network delay, it is conceivable that the synchronization control signals are not in time for the reference synchronization time.

Consequently, in the present embodiment, the above described problem is solved by employing a method in which, before the synchronization is achieved, the exchange of the synchronization control signal in the synchronization method described in the first exemplary embodiment is previously performed, a difference between the first synchronization time notified by the control apparatus 0, and the final third synchronization time calculated from the first synchronization time as well as the second synchronization times notified by the other terminals is stored, and the difference is used as a correction value from the first synchronization time.

Next, the present embodiment will be described in detail. First, before the synchronization is achieved, the exchange of the synchronization control signal in the synchronization method described in the first exemplary embodiment is previously performed. At this time, for the reference synchronization waiting time "τ" defined in the control apparatus 0, any value is previously defined. However, at this time, the value of "τ" itself has no meaning, and the first synchronization waiting time "$\tau 0i = \tau - (1/2) \times RTT0i$" notified from the control apparatus 0 to each terminal may be a negative value.

Subsequently, each terminal i calculates the second synchronization waiting time "$\tau ij$" for another terminal j based on the first synchronization waiting time "$\tau 0i$". Also in this case, it may be a negative value. If the first waiting time or the second waiting time is a negative value, the first synchronization time and the second synchronization time to be calculated from it become past times prior to the reception time of the notification of the first waiting time and the reception time of the notification of the second waiting time. Subsequently, the third synchronization time is calculated from the first synchronization time and the second synchronization time, and the difference between the first synchronization time and the third synchronization time is stored as a correction amount.

Next, at a timing when the synchronization is actually achieved, similarly to the comparative synchronization method shown in FIG. 3, only the notification of the first synchronization waiting time from the control apparatus 0 is performed. Then, the correction amount that has been previously stored as described above is added to the first synchronization waiting time notified at this synchronization timing, and thereby the third synchronization time is calculated.

Since a mode as described above is employed, even if there is the terminal with the large amount of network delay, and the synchronization control signals are not in time for the reference synchronization time, the synchronization accuracy similar to the first exemplary embodiment can be realized.

Although exemplary embodiments have been described in detail, it will be appreciated by those skilled in the art that various changes may be made to the exemplary embodiments without departing from the spirit of the inventive concept, the scope of which is defined by the appended claims and their equivalents.

What is claimed is:

1. A synchronization system, comprising:
a control apparatus and a plurality of terminals connected, in parallel, via a network, wherein each of the plurality of terminals is configured to communicate directly with each other one of the plurality of terminals, and wherein the plurality of terminals synchronize with one another for use of a predetermined control signal transmitted by the control apparatus, wherein:
the control apparatus comprises a processor and a memory storing a software program, wherein the processor is configured to run the software program stored in the memory and thereby operate as:
a control apparatus transmitting unit which transmits first waiting time information to each of the plurality of terminals, wherein the first waiting time information is a synchronization waiting time for the predetermined control signal transmitted from the control apparatus to the plurality of terminals, and the first waiting time information is calculated based on a first round trip time between the control apparatus and each of the plurality of terminals; and
each of the plurality of terminals comprises a processor and a memory storing a software program, wherein the processor is configured to run the software program stored in the memory and thereby operate as:
a first waiting time receiving unit, which receives the first waiting time information transmitted from the control apparatus;
a terminal transmitting unit, which, for each other of the plurality of terminals, calculates second waiting time information based on the first waiting time information and a previously-measured second round trip time between the terminal and each other of the plurality of terminals, and transmits the second waiting time information to each other of the plurality of terminals;
a second waiting time receiving unit which receives the second waiting time information transmitted from each other of the plurality of terminals; and
a synchronization time calculating unit which calculates a synchronization time for the predetermined control signal, based on the first waiting time information and the received second waiting time information;
wherein the memory further stores, as a correction value, a difference between the first waiting time and the synchronization time, calculated from the first waiting time information and the received second waiting time information.

2. The synchronization system according to claim 1, wherein the terminal transmitting unit:
calculates a first synchronization time using ½ of the first round trip time; and
calculates a second synchronization time using ½ of the second round trip time.

3. A terminal of a plurality of terminals connected, in parallel, via a network, to a control apparatus, wherein each of the plurality of terminals is configured to communicate directly with each other one of the plurality of terminals, and wherein the plurality of terminals synchronize with one another for use of a predetermined signal transmitted from the control apparatus, the terminal comprising:
a processor and a memory storing a software program, wherein the processor is configured to run the software program stored in the memory and thereby operate as:
a first waiting time receiving unit which receives first waiting time information transmitted from the control apparatus, wherein the first waiting time information is a synchronization waiting time for the predetermined control signal;
a terminal transmitting unit, which, for each other of the plurality of terminals, calculates second waiting time information based on the first waiting time information and a previously-measured second round trip time between the terminal and each other of the plurality of terminals, and transmits the second waiting time information to each other of the plurality of terminals;
a second waiting time receiving unit which receives the second waiting time information transmitted from each other of the plurality of terminals; and
a synchronization time calculating unit which calculates a synchronization time for the predetermined control signal, based on the first waiting time information and the received second waiting time information;
wherein the memory further stores, as a correction value, a difference between the first waiting time and the synchronization time, calculated from the first waiting time information and the received second waiting time information.

4. A non-transitory computer readable storage medium storing a synchronization program causing a computer of a terminal to execute a method, wherein the terminal is one of a plurality of terminals connected, in parallel, via a network to a control apparatus, wherein each of the plurality of terminals is configured to communicate directly with each other one of the plurality of terminals, the method comprising:
receiving first waiting time information transmitted from the control apparatus, wherein the first waiting time information is a synchronization waiting time for a predetermined control signal;
calculating second waiting time information based on the first waiting time information and a previously-measured second round trip time between the terminal and each other of the plurality of terminals;
transmitting the second waiting time information to each other of the plurality of terminals;

receiving the second waiting time information transmitted from each other of the plurality of terminals;

calculating a synchronization time for the predetermined control signal, based on the first waiting time information and the received second waiting time information; and storing, as a correction value, a difference between the first waiting time and the synchronization time, calculated from the first waiting time information and the received second waiting time information.

5. A synchronization method in a synchronization system comprising a control apparatus and a plurality of terminals information connected, in parallel, via a network, wherein each of the plurality of terminals is configured to communicate directly with each other one of the plurality of terminals, the method comprising:

the control apparatus transmitting first waiting time information to each of the plurality of terminals, wherein the first waiting time information is a synchronization waiting time for a predetermined control signal transmitted from the control apparatus to the plurality of terminals;

a terminal, of the plurality of terminals receiving the first waiting time information transmitted from the control apparatus;

the terminal calculating, for each other of the plurality of terminals, second waiting time information based on the first waiting time information and a previously-measured second round trip time between the terminal and each other of the plurality of terminals;

the terminal transmitting the second waiting time information to each other of the plurality of terminals;

the terminal receiving the second waiting time information from each other of the plurality of terminals;

the terminal calculating a synchronization time for the predetermined control signal, based on the first waiting time information and the received second waiting time information; and the terminal storing, as a correction value, a difference between the first waiting time and the synchronization time, calculated from the first waiting time information and the received second waiting time information.

6. The synchronization system according to claim 2, wherein:

the synchronization time calculating unit calculates the synchronization time for the predetermined signal by calculating an average value of the first synchronization time and the second synchronization time, or a weighted average value of the first synchronization time and the second synchronization time as the synchronization time for the predetermined signal.

7. The synchronization system according to claim 1, wherein the plurality of terminals comprises at least a first group of a first plurality of terminals and a second group of a second plurality of terminals, wherein;

the terminal transmitting unit of each of the first plurality of terminals calculates the second waiting time information with respect to each other of the first plurality of terminals and transmits the second waiting time information to each other of the first plurality of terminals; and the terminal transmitting unit of each of the second plurality of terminals calculates the second waiting time information with respect to each other of the second plurality of terminals and transmits the second waiting time information to each other of the second plurality of terminals.

8. A contents sharing system comprising:

a synchronization system according to claim 1, wherein each of the plurality of terminals performs contents reproduction content.

* * * * *